United States Patent
Sokol et al.

[11] 3,847,482
[45] Nov. 12, 1974

[54] APPARATUS FOR DETECTING A CHANGE IN TURBIDITY OF A SOLUTION

[75] Inventors: Michael Sokol, Abington; Frederick M. Kent, Warrington, both of Pa.

[73] Assignee: Bio/Data Corporation, Hatboro, Pa.

[22] Filed: July 10, 1972

[21] Appl. No.: 270,375

[52] U.S. Cl. .................. 356/40, 23/230 B, 356/96, 356/208
[51] Int. Cl. ...................... G01n 33/16, G01n 21/26
[58] Field of Search ........... 356/39, 40, 96, 97, 201, 356/208; 23/230 B

[56] References Cited
UNITED STATES PATENTS

| | | | |
|---|---|---|---|
| 3,492,095 | 1/1970 | Tillem | 23/230 B |
| 3,725,204 | 4/1973 | Marshall, Jr. et al. | 356/97 |

*Primary Examiner*—Vincent P. McGraw
*Attorney, Agent, or Firm*—Seidel, Gonda & Goldhammer

[57] ABSTRACT

A method and apparatus for detecting a change or a predetermined amount of change in the turbidity of a solution is disclosed. An important application of the method and apparatus of the present invention is in a rapid screening for the presence of Hemoglobin S in the blood. The blood may be combined with a reagent which causes any Hemoglobin S to become more insoluble producing turbidity in the resultant blood-reagent solution. The blood-reagent solution is mounted between the light source and a transducer. The output of the transducer is fed to a means for integrating the variations in the output signal of the transducer over a predetermined time interval. At the end of the predetermined time interval, an indication is given as to whether or not the integrated signal has exceeded a predetermined value. This indication may represent a predetermined change in the turbidity of the solution and also indicate whether blood being tested contains Hemoglobin S.

13 Claims, 6 Drawing Figures

PATENTED NOV 12 1974 3,847,482

APPARATUS FOR DETECTING A CHANGE IN TURBIDITY OF A SOLUTION

The present invention relates to a method and apparatus for detecting a change or a predetermined change in the turbidity of a solution. More particularly, the present invention relates to a method and apparatus for detecting a predetermined change in the turbidity of a blood-reagent solution in order to detect a particular characteristic of the blood.

The present invention may be used to detect a change or a predetermined change in the turbidity of any solution. One application of the present invention is to detect a predetermined change in the turbidity of a blood-reagent solution wherein the blood-reagent solution becomes turbid due to a particular characteristic of the blood being tested.

The present invention is particularly useful in screening persons for the presence of Hemoglobin S in their blood. Hemoglobin S is presently considered to be an inherited genetic trait. Heterozygous Hemoglobin S produces few symptoms in the person and may be referred to as sickle cell trait. Homozygous Hemoglobin S results in an anemia whose symptoms include leg ulcers and acute attacks of pain.

Sickle cell trait has been found predominantly in persons of the Negro race. However, Hemoglobin S and the resulting sickle cell trait or sickle cell anemia may be found in persons of other races and especially in persons having a mixture of Negro blood. Sickle cell anemia is a serious disease and an improper diagnosis could cause further serious complications. Persons having sickle cell trait should not be subjected to a low oxygen atmosphere since hypoxia may result.

The present invention provides a low cost, fast and efficient means to test persons for the presence of Hemoglobin S. The person conducting the test does not need specialized training or skills and a subjective judgment of the results is not required. The present invention provides a means by which a blood sample may be tested in approximately forty seconds. The blood-reagent solution is tested by optical means in accordance with the present invention and therefore the tests may be conducted with a minimum of blood-reagent solution since the blood-reagent solution need not be visually examined by a person. The advantage of requiring a minimum of blood-reagent solution is important since the reagent may be expensive and it is often desirable to use a minimum amount of blood in each test, especially when a plurality of tests are being made on a single patient.

The easily conducted, low cost and effective test for Hemoglobin S in accordance with the present invention is a tremendous aid to a physician examining a patient who may be afflicted with sickle cell anemia since the symptoms of sickle cell anemia are also common to abdominal disease, rheumatic fever and neurological disorders. A blood test for Hemoglobin S in accordance with the present invention will quickly indicate to the physician either the absence or the probable presence of Hemoglobin S and therefore either rule out or indicate the fact that the ailment is sickle cell anemia.

Furthermore, it is an important advantage of the present invention to provide a low cost, rapid and easily administered tests for Hemoglobin S in order to detect sickle cell trait in a person since a person having even a sickle cell trait should not be subjected to a low oxygen condition such as may occur during surgery or while flying in an airplane. The rapid and inexpensive tests for Hemoglobin S in accordance with the present invention allows the screening of persons for Hemoglobin S and widespread inexpensive use. The present invention may also be used to screen blood donors for sickle cell anemia or sickle cell trait since it is not desirable to give a transfusion of blood containing Hemoglobin S.

Various methods are known in the prior art for testing the blood for sickle cells. However, these tests are subject to the disadvantages of complexity requiring skilled persons to conduct the tests and interpret the results, a long period of time in order to conduct a single test and are relatively expensive as compared with the cost of a test in accordance with the present invention. A summary of these tests may be found in U.S. Pat. No. 3,492,095 issued to Harold B. Tillem. U.S. Pat. No. 3,492,095 describes a test which requires at least 2 minutes to conduct, a much larger volume of reagent in order to allow proper interpretation of the result by the person conducting the test, and a subjective judgment of the results.

Briefly, in accordance with the present invention, a method of testing blood for the presence of Hemoglobin S is disclosed in which a predetermined quantity of blood and a predetermined quantity of reagent are combined in a transparent container. The reagent is of a type which causes any Hemoglobin S in the blood to be more insoluable producing a turbidity of the resultant blood-reagent solution. A transparent container is mounted between the light source and a transducer responsive to the light passing through the transparent container and the blood-reagent solution from the light source. Variations in the output signal of the transducer are integrated over a predetermined time interval. An indication is produced which indicates whether the value of the integrated output signal of the transducer exceeds a predetermined value. The value of the integrated signal is proportional to the amount of light passing through the blood-reagent solution and therefore inversely proportional to the turbidity of the blood-reagent solution.

The reagent used in the method of testing the blood for the presence of Hemoglobin S may be any suitable type of reagent which causes the Hemoglobin S to become more insoluable and produce a turbidity of the resultant blood-reagent solution. That is, the reagent may be any solution which cuases the Hemoglobin S to precipitate and produce turbidity in the blood-reagent solution. One type of reagent is a reagent containing a high ionic concentration buffer solution, an erythrocytic hemolyzing agent which is capable of inducing multiple lesions of the erythrocyte membrane, and a reducing agent which reduces Hemoglobin S to its reduced form so that it is substantially insoluble in the solution.

Briefly, in accordance with the present invention, apparatus is provided for carrying out the method of the present invention. The apparatus of the present invention detects a predetermined rate of change in the optical density of a fluid being tested. The apparatus is provided with a light source and a transducer means responsive to the light output of the light source. A transparent container containing the fluid to be tested is mounted between the light source and the transducer means. Variations in the output signal of the transducer means are integrated by an integrating means over a predetermined time interval or until the value of the integrated signal variations reach a predetermined minimum value. Means are provided for indicating whether the integrated variations in the output signal of the transducer means exceeds a predetermined value. When the indicating means indicates that the integrated value exceeds the predetermined value, this corresponds to a high level of optical density.

When the apparatus of the present invention is used for testing blood for the absence or probable presence of Hemoglobin S, the precipitating Hemoglobin S produces turbidity in the blood-reagent solution. The blood-reagent solution therefore maintains a low optical density during the predetermined time interval when Hemoglobin S is present in the blood being tested. If the blood being tested contains Hemoglobin S, the transmission of light through the blood-reagent solution does not increase substantially and therefore the integrated variations in the output signal of the transducer do not reach the predetermined value or level. Therefore, indicating means indicates that Hemoglobin S is present in the blood being tested.

For the purpose of illustrating the invention, there are shown in the drawings forms which are presently preferred; it being understood, however, that this invention is not limited to the precise arrangements and instrumentalities shown.

Figure 5:
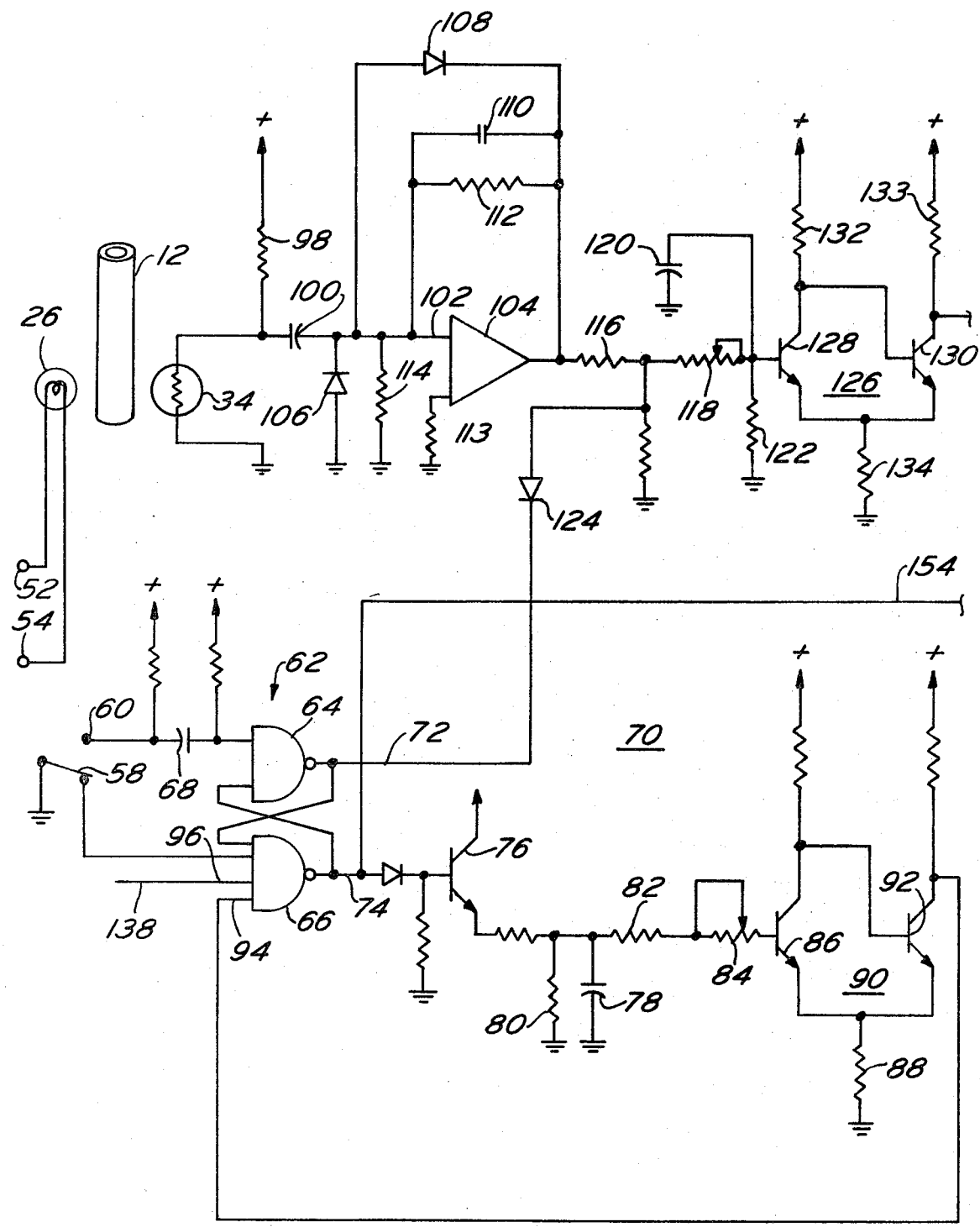
Figure 6:
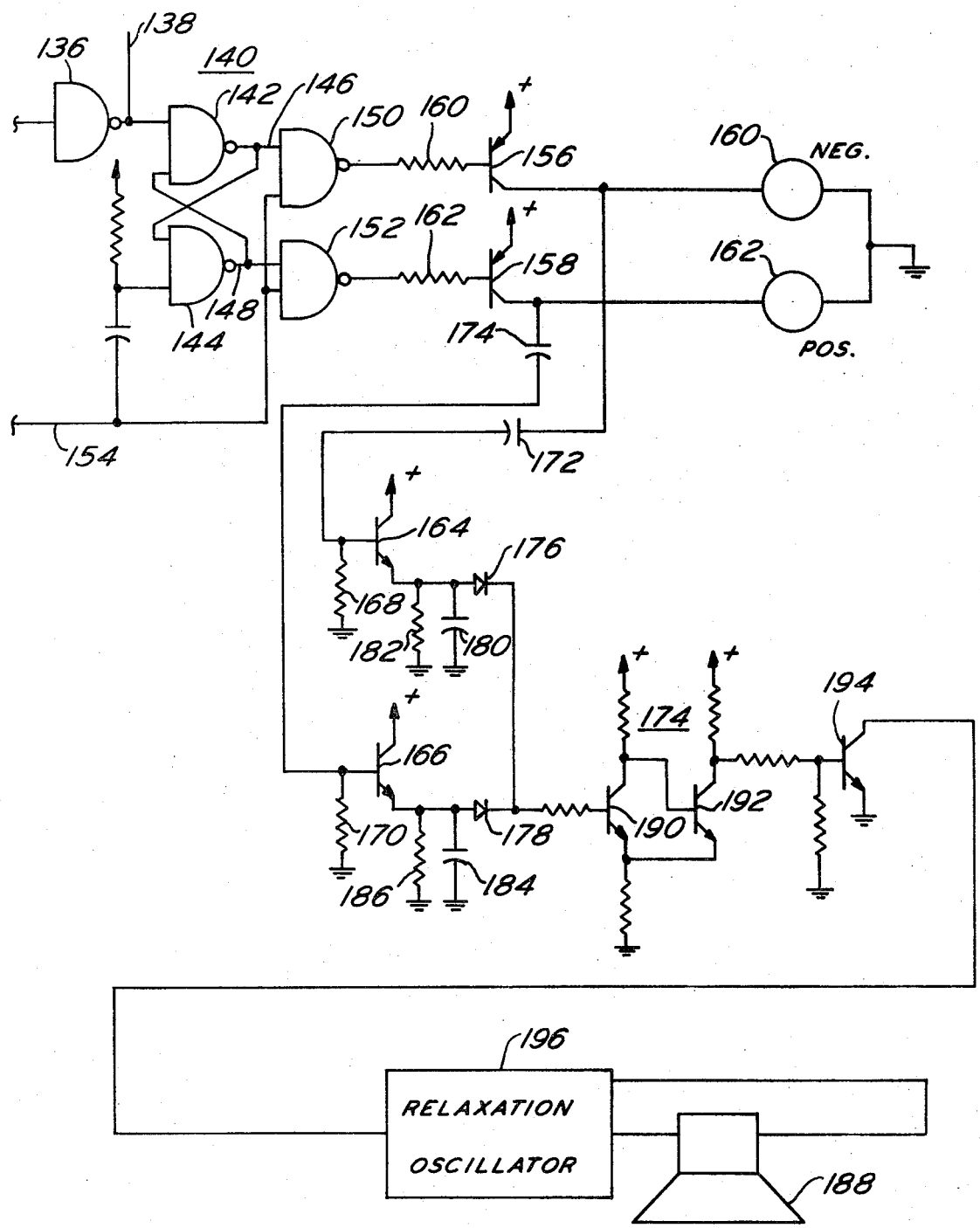

FIGS. 5 and 6 comprise a schematic diagram of circuitry which may be used in one embodiment of the present invention.

One aspect of the present invention is the provision of apparatus which may be used to detect a predetermined change in the optical density of a fluid. This apparatus may be used in various medical diagnosis tests in which the result is determined by a change in turbidity of the solution being tested. However, one particular application of the apparatus of the present invention is to detect a predetermined rate of change of turbidity of a blood-reagent solution in order to quickly and efficiently screen persons for Hemoglobin S.

In accordance with the present invention, whole blood is combined with a reagent which causes any Hemoglobin S cells to become insoluble causing a turbidity in the blood-reagent solution. One specific example of a reagent which may be used in accordance with the present invention is described in U.S. Pat. No. 3,492,095 issued to Harold B. Tillem. This reagent is commercially available under the trademark SICKLEDEX from Ortho Diagnostics, Raritan, N. J. The reagent sold under the SICKLEDEX trademark is at present a preferred reagent for use in practicing the method of the present invention. The SICKLEDEX reagent is a three component solution consisting of a phosphate buffer (pH 6.5 to 6.8), reducing agent (5.4 percent sodium dithionite) and an erythrocytic hemolysis agent (1.8 percent saponin).

In practicing the present invention in accordance with one preferred embodiment, 0.02 milliliters of whole blood is combined with 0.2 milliliters of SICKLEDEX reagent. Although specific examples of quantities and reagents are given, these are not intended to be limiting, but are only illustrative examples. The blood and the reagent should be combined to form a blood-reagent solution. This may usually be accomplished by first inserting the blood and then forcibly inserting the reagent into a transparent container or vice versa. However, the blood and reagent may be combined to form the blood-reagent solution by any suitable method such as by vortex, lateral swirling or multiple inversions. Preferably, the blood used in performing the test will be whole blood that has been anti-coagulated. The whole blood may be anti-coagulated by any of the standard anti-coagulants such as sodium citrate, sodium oxalate, or ethylene diamine tetracetic acid. However, if the test is run on fresh blood which has been recently taken from the patient or person to be tested, the addition of anti-coagulants is not necessary.

Since the method and apparatus of the present invention allow a non-subjective test which does not need to be interpreted by human perception, the amount of blood-reagent solution may be kept at a minimum. In a preferred method of practicing the present invention, 0.02 milliliters of blood is combined with 0.2 milliliters of SICKLEDEX reagent. By using these quantities and with the method and apparatus of the present invention, the precipitation of Hemoglobin S will be sufficiently complete in a maximum of 60 seconds in order to make an accurate determination as to the absence or a probable presence of Hemoglobin S in the blood being tested. Small amounts of reagent and a short interval of time for precipitation to occur is enabled by the elimination of subjectivity in the interpretation of the end result. That is, in accordance with the method and apparatus of the present invention, the end result may be interpreted by means of optical and electronic means.

Figure 1:
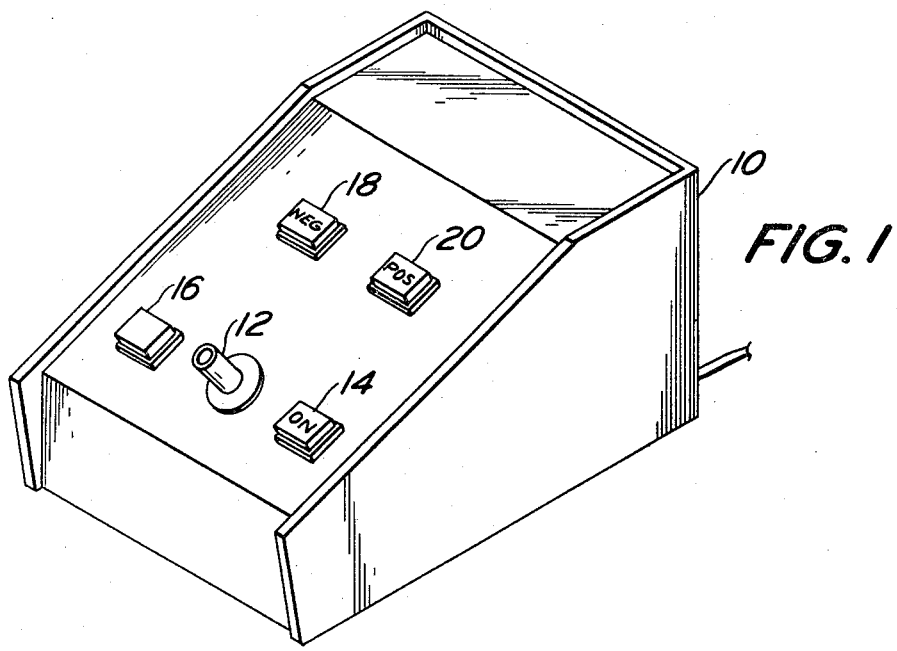
FIG. 1 is a perspective view of an apparatus in accordance with the present invention.
Figure 2:
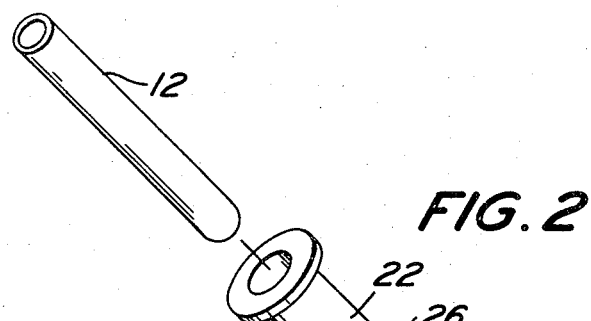
FIG. 2 is a perspective view of a transparent container and a receiving means for the container in accordance with the present invention.
Figure 3:
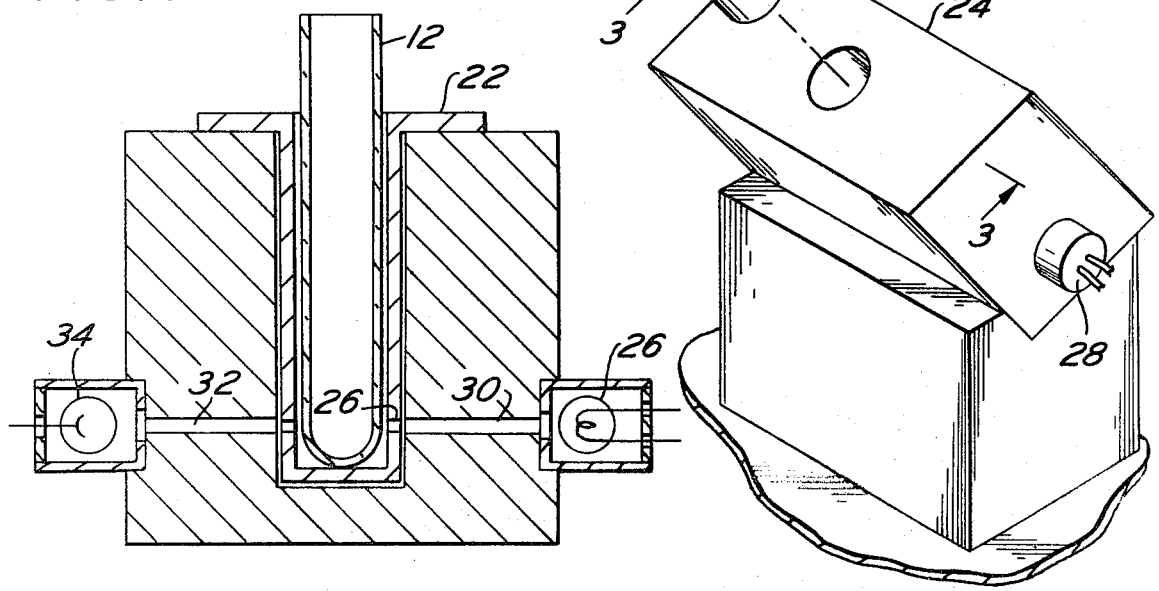
FIG. 3 is a cross sectional view taken along line 3—3 of FIG. 2.

Referring now to the drawings in detail, wherein like numerals indicate like elements, there is shown in FIG. 1 one embodiment of an apparatus in accordance with the present invention having a housing 10. A transparent container or test tube 12 is shown in FIGS. 1 and 3 in its actual test position. A full view of test tube 12 is shown in FIG. 2. Test tube 12 may preferably have an outside diameter of 7 millimeters and a length of approximately 70 millimeters. The inside diameter of the test tube may preferably have a diameter of 5.8 to 6 millimeters. A test tube of these dimensions may be economically manufactured and may be of a disposable type. The small dimensions of the test tube also allow the use of a lesser amount of reagent than would be required by using a large test tube.

The housing 10 is provided with a switch 14 for turning on the apparatus. Switch 16 is a start switch for initiating the test. Indicator lights 18 and 20 provide an indication of negative and positive responses, respectively.

As may be most clearly seen in FIGS. 2 and 3, a sleeve 22 is provided for receiving test tube 12. The sleeve 22 is removable from member 24 in order to provide the advantage of ease in cleaning out the test tube receiving sleeve 22. The test tube 12 may occasionally have blood or reagent spilled on its outer surface which will be necessary to clean from sleeve 22.

Sleeve 22 is provided with a hole 26 which allows the passage of light through test tube 12 and any blood-reagent solution therein. The light originates from light source 26 which is mounted in lamp socket 28. The light from light source 26 travels through passageway 30 in member 24, passageway or hole 26 in sleeve 22, test tube 12 and any blood-reagent solution therein, and passageway 32 to transducer 34. Transducer 34 may be a photoelectric cell or any other suitable light responsive means which converts light energy impinging thereon into an electrical signal. The sleeve 22 and member 24 may be provided with a key and groove in order to keep the hole 26 in member 22 in alignment with passageways 30 and 32 in member 24.

In accordance with the present invention, switch 14 is depressed in order to turn on the apparatus. Whole blood and a suitable reagent are combined in test tube 12. Test tube 12 containing the blood-reagent solution is inserted into sleeve 22. Switch 16 is then depressed in order to start the test by the apparatus. Turning on of switch 16 initiates the operation of a timer. The variations in the output signal of transducer 34 are integrated. If the blood-reagent solution in test tube 12 remains turbid due to the precipitation of Hemoglobin S, there will be no substantial increase in the output signal of transducer 34. In such a case, the integrated variations of the output signal of transducer 34 will not reach a predetermined minimum value and indicator light 20 will be energized indicating that the test is positive. That is, indicator light 20 indicates the probable presence of Hemoglobin S. The turbidity of the solution may be caused by the precipitation of an abnormal hemoglobin other than Hemoglobin S. If the test result is positive, a sample of the patient's blood may then be sent for a more extensive test such as electrophoresis. If the persons or patient under test does not have Hemoglobin S or another abnormal hemoglobin which will precipitate in the reagent, the blood-reagent solution in test tube 12 will clear causing an increase in the output of transducer 34. The integrated value of the variation in the output signal of transducer 34 will exceed a predetermined minimum value and will cause the energization of indicator light 18 indicating a negative test. That is, the energization of indicator light 18 will indicate that the blood being tested does not have Hemoglobin S or any other abnormal hemoglobin which would precipitate in the reagent.

Figure 4:
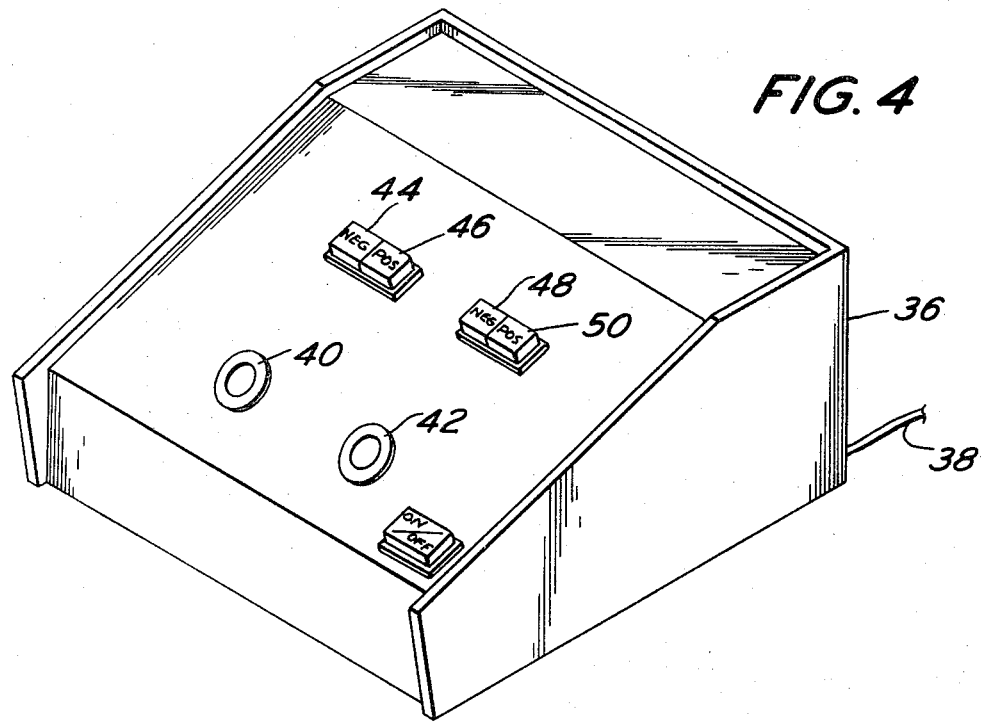
FIG. 4 is a perspective view of another embodiment of an apparatus in accordance with the present invention.

Referring now to FIG. 4 there is shown a housing 36 having an input power cable 38 and a switch 40 for turning on and off the apparatus. The housing 36 is provided with a pair of sleeves or test tube receiving means 40 and 42. A pair of indicator lights 44 and 46 are provided in conjunction with test tube receiving means 40. Indicator lights 48 and 50 are provided in conjunction with test tube receiving means 42. Indicator lights 44 and 48 indicate negative reactions for tests being conducted in test tube receiving means 40 and 42, respectively. Indicator lights 46 and 50, when lit, indicate positive test results for tests being conducted in test tube receiving means 40 and 42, respectively. In the embodiment shown in FIG. 4, the start switch has been eliminated. A microswitch is provided in test tube receiving means 40 and 42 for initiating the operation of the tests. The microswitch is actuated by insertion of the test tube into the receiving means. In the embodiment shown in FIG. 4, two tests may be conducted simultaneously or one test may be in process while the test tube is being inserted or removed from the other test tube receiving means. The implementation of two independent test means provides an even faster means of screening a large number of persons for Hemoglobin S or sickle cell trait.

Referring now to the circuitry shown in FIGS. 5 and 6, there is shown a light source 26, a test tube 12 and a transducer 34. The light source 26 is connected to a supply of power via terminals 52 and 54. Switch 58 of FIG. 5 may correspond to switch 16 of FIG. 1 which functions as a start switch or may correspond to a microswitch mounted in either test tube receiving means 40 or 42. With respect to FIG. 4, a circuit as shown in FIGS. 5 and 6 will be provided for each of the test tube receiving means 40 and 42. The discussion to follow hereinafter will apply to either one of the test tube receiving means in housing 36 or to FIG. 1.

When switch 58 is closed upon switch terminal 60 by either depressing switch button 16 or by closing of the microswitch in test tube receiving means 40 or 42, flip flop 62 comprised of inverters 64 and 66 is set via capacitor 68. The setting of flip flop 62 initiates the operation of a timing circuit shown generally at 70. When switch terminal 60 is grounded by the closing of switch 58, flip flop 62 is set causing output 72 to go high and output 74 to go low. Output 74 going low causes transistor 76 to turn off. Turning off of transistor 76 allows capacitor 78 to discharge through resistor 80 and a path formed by resistor 82, rheostat 84, the base-emitter circuit of transistor 86 and resistor 88. The R-C time constant of the discharge circuit of capacitor 78 determines the timing of timing circuit 70. This R-C time constant may be adjusted by means of rheostat 84. Upon discharge of capacitor 78 to a predetermined level, Schmitt trigger circuit 90, comprised of transistors 86 and 92 is fired. The output of Schmitt trigger circuit 90 is fed back to input 94 of flip flop 62 which resets flip flop 62. The resetting of flip flop 62 causes a rising or going high signal on output 74 and a falling or going low of signal on output 72. Therefore, a rising signal appears on output 74 a predetermined time interval after the initiation of the test by either depressing start switch 16 or the insertion of the test tube into receiving means 40 or 42. In a preferred embodiment, the R-C time constant of discharge circuit of capacitor 78 may be selected to be approximately 60 seconds. Input 96 of flip flop 62 provides a reset input which allows flip flop 62 to be reset and the test terminated as soon as a negative result is detected at the output of the integrating means as will be described more fully hereinafter. This resetting feature allows the test to be completed in as little as 10 to 30 seconds in cases where the blood-reagent solution clears rapidly or in other words where there is no abnormal hemoglobin.

As discussed above, the light from light source 26 passes through the blood-reagent solution in test tube 12 and impinges upon transducer 34. Transducer 34 is connected in series with resistor 98 between a positive supply voltage and ground. The variations in the output of transducer 34 are fed through coupling capacitor 100 to input 102 of amplifier 104. Diode 106 is a limiting diode. Diode 108 limits the output of amplifier 104 to a positive output signal. Capacitor 110 is a by-pass capacitor and resistors 112-114 are gain determining resistors of amplifier 104.

As discussed above, if the blood in the blood-reagent solution in test tube 12 does not contain Hemoglobin S, the blood-reagent solution in test tube 12 will clear in about 10 to 30 seconds when 0.02 milliliters of blood and 0.2 milliliters of reagent are used as discussed above. This clearing or lack of turbidity of the blood-reagent solution allows an increase in the light energy impinging upon transducer 34. This increase in the light radiation impinging upon transducer 34 causes a decrease in the resistance of transducer 34. This causes a negative going signal to be coupled through capacitor 100 to the input 102 of amplifier 104. This negative going signal on input 102 of amplifier 104 causes a positive going signal on the output of amplifier 104. This positive going signal is fed via resistor 116 and rheostat 118 to integrating capacitor 120. Integrating capacitor 120 is completely discharged prior to the test via resistor 122 and a path comprised of rheostat 118 and diode 124. Prior to the test, the output 72 of flip flop 62 was low thereby causing diode 124 to be conductive. Once the test is initiated, the signal on output 72 goes high causing diode 124 to become non-conductive. When diode 124 is non-conductive, the output of amplifier 104 is fed to integrating capacitor 120.

In a case where the blood-reagent solution in test tube 12 does not contain Hemoglobin S, capacitor 120 will become sufficiently charged to fire Schmitt trigger circuit 126. Schmitt trigger circuit 126 is comprised of transistors 128 and 130 and resistors 132-134. The output pulse of Schmitt trigger circuit 126, when triggered, is fed through inverter 136. The output of inverter circuit 136 is fed via line 138 to input 96 of flip flop 62 in order to reset flip flop 62. The output of inverter 136 is also fed to flip flop 140 which is comprised of inverters 142 and 144. A pulse is present on the output of inverter 136 when Schmitt trigger 126 is fired. When an output pulse is present on the output of inverter 136, flip flop 140 is set causing output 146 to go high. The signal on output 148 of flip flop 140 would go low when the signal on output 146 goes high.

The signals on outputs 146 and 148 of flip flop 140 are fed to AND gates 150 and 152, respectively. AND gates 150 and 152 receive a gating input from output 74 of flip flop 62 via line 154 when flip flop 62 is reset after the predetermined time interval. Assuming a case where the blood-reagent solution in test tube 12 does not contain any Hemoglobin S, capacitor 120 would have been charged to a level sufficient to trigger Schmitt trigger circuit 126. The output pulse of Schmitt trigger circuit 126 would have set flip flop 140 producing a high signal on output 146 of flip flop 140. The high signal on output 146 of flip flop 140 would be gated by AND gate 150 when flip flop 62 is reset. The resetting of flip flop 62 occurs as flip flop 140 is set in the case of a negative test result where test tube 12 does not contain any Hemoglobin S or other abnormal hemoglobin. That is, flip flop 62 would be reset from the output of inverter 136 via line 138. If the test were positive or in other words test tube 12 contained Hemoglobin S or some other abnormal hemoglobin which would cause turbidity of the blood-reagent solution in test tube 12, flip flop 62 would not be reset until the end of a normal predetermined timing cycle determined by the discharge time of capacitor 78. Line 138 and the early resetting of flip flop 62 in the case of a negative test need not be provided. However, this early resetting of flip flop 62 substantially decreases the amount of time required to conduct a test since most negative blood samples, that is samples not containing abnormal hemoglobin, will clear in about 10 to 30 seconds. Therefore, the time for conducting a test may be reduced from the predetermined time which may be selected to be about 60 seconds to a time somewhere in the neighborhood of 10 to 30 seconds when the blood sample is negative.

The output of AND gates 150 and 152 are fed to the bases of transistors 156 and 158, respectively via resistors 160 and 162, respectively. Lamps 160 and 162 are energized by transistors 156 and 158, respectively, when its respective transistor is turned on. Lamps 160 and 162 may be any other suitable type of indicating means. Lamp 160 may correspond to indicator light 18 in FIG. 1 or to either indicator light 44 or 48 in FIG. 4. Similarly, lamp 162 may correspond to indicator light 20 in FIG. 1 or either indicator light 46 or 50 in FIG. 4.

The outputs of transistors 156 and 158 are also fed to the bases of transistors 164 and 166, respectively, via R-C coupling networks comprised of resistors 168 and 170 and capacitors 172 and 174. The outputs of transistors 164 and 166 are fed to Schmitt trigger circuit 174 via diodes 176 and 178, respectively. Capacitor 180 and resistor 182 primarily determine the pulse width output of transistor 164. Similarly, capacitor 184 and resistor 186 primarily determine the pulse width output of transistor 166. The values of capacitors 180 and 184 and resistors 182 and 186 may be identical or the values of one of the pairs may be selected to be larger than the other, as is well known in the art, in order to produce a longer pulse width output of one of the transistors 164 and 166. For example, the selection of larger values of capacitance and resistance for capacitor 184 and resistor 186 would produce an audible alarm from speaker or audible device 188 for a longer period of time. In such a case, a longer audible alarm would be provided in the case of a positive test result than in the case of a negative test result.

Schmitt trigger 174 is comprised of transistors 190 and 192 and associated resistances as is well known in the art. Schmitt trigger circuit 174 receives its input from either transistor circuit 164 or 166 and produces an output pulse to transistor switch 194. The output of transistor switch 194 is fed to a relaxation oscillator 196, which provides a series of oscillations in response to the output of transistor switch 194.

In operation, in accordance with the method and the embodiment of the circuitry described, anti-coagulated whole blood is deposited into test tube 12. A reagent such as SICKLEDEX reagent or other suitable reagent is deposited into test tube 12 in a manner so that the reagent and the whole blood become mixed or combined to form a blood-reagent solution. The test tube 12 containing the blood-reagent solution is inserted into sleeve 22 of the embodiment shown in FIG. 1 or into test tube receiving means 40 or 42 of the embodiment shown in FIG. 4 after the power has been turned on in either of these embodiments. In the case of the embodiment shown in FIG. 1, the start switch 16 would be depressed to initiate operation. In the case of the embodiment in FIG. 4, the insertion of the test tube into test tube receiving means 40 or 42 would operate a microswitch which would automatically initiate the test.

As discussed above, switch 58 would correspond to either the microswitch or the start switch 16. Once the operation is initiated, timing means 70 produces a low signal on line 154 when integrating capacitor 120 becomes sufficiently charged due to the lack of turbidity of the blood-reagent solution in test tube 12 or at the end of a predetermined time determined by the discharge time constant of capacitor 78, whichever occurs first.

Light from light source 26 travels through the blood-reagent solution in test tube 12 and impinges upon transducer 34. The variations in the output signal of transducer 34 are coupled through capacitor 100 to the input of amplifier 104. The output of amplifier 104 charges capacitor 120. Capacitor 120 had been discharged via diode 124 and the other resistive paths prior to initiation of the timing cycle. If the charge on integrating capacitor 120 reaches a predetermined minimum, Schmitt trigger circuit 126 is fired. The output of Schmitt trigger circuit 126 is fed through inverter 136 to set flip flop 140 and back to reset flip flop 62 if Schmitt trigger 126 was fired. The output of flip flop 140 is gated by AND gates 150 and 152 when output 74 of flip flop 62 on line 154 goes high. The gated signal output of AND gates 150 and 152 energizes lamp 160 or lamp 162 depending upon the state of flip flop 140. If lamp 160 is energized, this indicates that the blood sample being tested does not have Hemoglobin S in the blood-reagent solution. If lamp 162 were energized, this would indicate that the blood sample probably contains Hemoglobin S.

The outputs of transistors 156 and 158 are also fed via transistors 164 and 166 to energize a speaker or other audible device 188. If just a single sound or beep is desired at the end of the test, the outputs of transistors 156 and 158 may be fed to one of the transistor amplifiers 164 and 166 and the other transistor amplifier eliminated or both transistor amplifiers 164 and 166 may have identical component values. Alternatively, if it is desired to provide a series of beeps or a longer sound upon a positive test result, resistor 186 and capacitor 184 may be chosen to have larger values to produce a larger time constant and therefore produce a longer output pulse from transistor amplifier 166. The outputs of transistor amplifiers 164 and 166 are fed through Schmitt trigger 174 and amplifier 194 to relaxation oscillator 196 which drives speaker 188.

It will be apparent to those skilled in the art that various changes and modifications may be made to the invention described herein. For example, various types of timing circuits may be used in the present invention. In addition, other types of gating and pulse forming circuits may also be used. Various other types of indicators may be used to indicate the results.

In view of the above, the present invention may be embodied in other specific forms without departing from the spirit or essential attributes thereof and, accordingly, reference should be made to the appended claims, rather than to the foregoing specification as indicating the scope of the invention.

We claim:

1. Apparatus for testing blood for the presence of Hemoglobin S, comprising:
    means for receiving a substantially transparent container for holding a predetermined quantity of blood combined with a reagent which produces turbidity in the blood-reagent solution;
    a light source;
    transducer means, said transducer means producing an output signal responsive to light impingent thereon, said transparent container receiving means being mounted between said light source and said transducer means;
    means for passing only variations in the output signal of said transducer means to produce an optical density variation signal;
    means for integrating said optical density variation signal to produce a level signal;
    threshold detector means for detecting when said level signal exceeds a predetermined value and producing an output signal;
    timing means for generating a timing signal a predetermined time after initiation of the test;
    gating means for gating the output signal of said threshold detector in response to said timing signal; and
    indicating means responsive to the output of said gating means for indicating whether or not said threshold detector means detected a level signal of said predetermined value corresponding to the absence or probable presence of Hemoglobin S in the blood being tested.

2. Apparatus in accordance with claim 1 wherein said receiving means is removable for cleaning.

3. Apparatus in accordance with claim 1 wherein said substantially transparent container is a test tube having an inner diameter of approximately 5.8 to 6 millimeters and a length of approximately 70 millimeters.

4. Apparatus in accordance with claim 1 wherein said reagent is a solution including a high ionic concentration buffer solution, a reducing agent and an erythrocytic hemolyzing agent in which Hemoglobin S in its reduced form is substantially insoluble.

5. Apparatus in accordance with claim 1 wherein said transducer means includes a photoelectric cell.

6. Apparatus in accordance with claim 1 wherein said means for passing only variations in the output signal of said transducer means includes an amplifier having a capacitor in series with its input.

7. Apparatus in accordance with claim 1 wherein said integrating means includes a capacitor and a variable resistor for adjusting the integrating rate of said capacitor.

8. Apparatus in accordance with claim 1 wherein said threshold detector means comprises a Schmitt trigger circuit.

9. Apparatus in accordance with claim 1 wherein said timing means includes a microswitch for initiating operation of said timing means, said microswitch being operated by the insertion of the container into said receiving means.

10. Apparatus in accordance with claim 1 wherein said timing means generates a timing signal upon said threshold detector means detecting said level signal of said predetermined value.

11. Apparatus in accordance with claim 1 wherein said gating means includes a bistable circuit, said bistable circuit having a first and a second output and being set in response to the output signal of said threshold detector means, and a pair of AND gates, each of said AND gates receiving as inputs an output from said bistable circuit and the timing signal.

12. Apparatus in accordance with claim 1 wherein said indicator means includes a first and a second lamp.

13. Apparatus in accordance with claim 12 wherein said indicator means includes means for producing an audible signal.

* * * * *